(12) United States Patent
Zottele et al.

(10) Patent No.: US 9,920,829 B2
(45) Date of Patent: Mar. 20, 2018

(54) COOLER FOR A MARINE TRANSMISSION GEARBOX

(71) Applicant: ZF Friedrichshafen AG, Friedrichshafen (DE)

(72) Inventors: Michele Zottele, Trento (IT); Giuliano Montagni, Riva del Garda (IT)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 15/000,126

(22) Filed: Jan. 19, 2016

(65) Prior Publication Data

US 2016/0265649 A1 Sep. 15, 2016

(30) Foreign Application Priority Data

Mar. 10, 2015 (DE) .......................... 10 2015 204 272

(51) Int. Cl.
*F16H 57/04* (2010.01)
*B63H 21/38* (2006.01)

(52) U.S. Cl.
CPC ..... *F16H 57/0415* (2013.01); *F16H 57/0417* (2013.01); *F16H 57/0484* (2013.01); *B63H 21/383* (2013.01)

(58) Field of Classification Search
CPC ............. F16H 57/0412; F16H 57/0415; F16H 57/0416; F16H 57/0417; F16H 57/0421; F16H 57/0424; F16H 57/0484; B63H 1/28; B63H 21/383; B63H 23/00; B63H 23/02; F01P 2050/02; F01P 2050/12
See application file for complete search history.

(56) References Cited

U.S. PATENT DOCUMENTS

| 2,796,239 | A | * | 6/1957 | Holmes | ................ | F28D 1/0213 |
| | | | | | | 165/164 |
| 6,997,238 | B1 | * | 2/2006 | Ruthy | ................ | F16H 57/0417 |
| | | | | | | 165/41 |
| 7,308,970 | B2 | * | 12/2007 | Holub | ................ | F16H 57/0408 |
| | | | | | | 184/1.5 |

(Continued)

FOREIGN PATENT DOCUMENTS

| DE | 102010009509 A1 * | 9/2011 | ............. B60K 17/16 |
| DE | 102012012840 A1 * | 12/2013 | ............. F16D 13/72 |
| WO | WO 2005040709 A1 * | 5/2005 | ................ F28F 3/12 |

OTHER PUBLICATIONS

Machine translation of DE 102010009509 A1 obtained on Mar. 9, 2017.*

*Primary Examiner* — Adam D Rogers
(74) *Attorney, Agent, or Firm* — Davis & Bujold PLLC; Michael J. Bujold

(57) ABSTRACT

A cooler for cooling a marine transmission gearbox by a cooling fluid. The cooler (1) comprises a cooler housing (2) which is made of plastic and a heat sink element (3) which is arranged at least partially inside a cavity (39) of the cooler housing (2) so that the heat sink element (3) is in contact with the cooling fluid, during operation. The heat sink element (3) is attachable to the gearbox housing (4) of the marine transmission gearbox in such a way that heat is transferable from the gearbox housing (4), via the heat sink element (3), to the cooling fluid. A marine transmission gearbox with such a cooler (1) is also part of the present invention.

14 Claims, 4 Drawing Sheets

(56) References Cited

U.S. PATENT DOCUMENTS

| | | | |
|---|---|---|---|
| 7,517,264 B2* | 4/2009 | Carr | B63H 23/06 |
| | | | 440/111 |
| 7,637,337 B2* | 12/2009 | Stranges | F01M 11/0004 |
| | | | 180/69.1 |
| 7,748,442 B2* | 7/2010 | Kalbacher | F01M 5/002 |
| | | | 165/166 |
| 8,196,707 B2* | 6/2012 | Kardos | F01P 11/08 |
| | | | 137/468 |
| 9,360,262 B2* | 6/2016 | Kim | F28F 27/02 |
| 2006/0089062 A1 | 4/2006 | Carr | |
| 2012/0061048 A1* | 3/2012 | Ohi | F01M 5/002 |
| | | | 165/51 |
| 2014/0311143 A1* | 10/2014 | Speidel | F02B 37/00 |
| | | | 60/599 |
| 2014/0373427 A1* | 12/2014 | Watanabe | A01K 87/04 |
| | | | 43/24 |
| 2017/0044968 A1* | 2/2017 | Kimball | F01P 3/207 |

* cited by examiner

COOLER FOR A MARINE TRANSMISSION GEARBOX

The present invention concerns a cooler for cooling a marine transmission gearbox by means of a cooling fluid.

A boat drive system including different gearboxes with a cooling system for the gearboxes is described in US 20060089062 A1. The cooling system comprises cooling pads for the gearboxes of the boat drive system. Each cooling pad is connected to the associated gearbox housing and supplied with cooling liquid to inhibit overheating of the gear arrangement within the housing.

The aim of the present invention is to provide a cooler for a marine transmission gearbox which provides sufficient heat transfer capacity while being easy to produce, to assemble and to maintain.

This invention provides a cooler for cooling a marine transmission gearbox by means of a cooling fluid. The cooler comprises a cooler housing made of plastic and a heat sink element which is arranged at least partially inside a cavity of the cooler housing, so that the heat sink element comes in contact with the cooling fluid during operation. The heat sink element is attachable to the gearbox housing of the marine transmission gearbox in such a way that heat is transferable from the gearbox housing via the heat sink element to the cooling fluid.

The two-piece construction of the cooler housing and the heat sink element allows for easy maintenance, because the cooler can be disassembled and the inside parts can be cleaned easily. The parts can further be fixed or exchanged separately, if necessary. If further allows the use of different materials and advantageous production methods for the parts of the cooler. By the use of a plastic cooler housing the cooler can be produced cheaper compared to conventional coolers made of metal materials only. Nonetheless sufficient thermal performance of the presented cooler is reached by the use of the heat sink element, which can be made of a material with a high thermal conductivity coefficient. Hence the heat sink element is preferably made of metal or an alloy, for example aluminium, aluminium alloy or red brass.

Advantageously there are provided plane and smooth contact surfaces at the gearbox housing and the heat sink element to enhance the heat transfer and the cooling effect of the cooler. In order to further facilitate the heat transfer from the gearbox housing to the heat sink element, a heat sink compound like a high conductibility gel may be provided between the two parts.

There are different plastic materials usable for the cooler housing. Preferably the plastic material is salt water resistant, enabling the cooler to be used with seawater as cooling fluid. Further the plastic material can be reinforced with fibers, e.g. with glass fibers, thus increasing the stiffness and stability of the cooler housing and the cooler.

According to a preferred embodiment of the invention the cooler housing and the heat sink element together form a closed inner space inside the cooler for the cooling fluid flow between an inlet connection and an outlet connection. This simple two-part construction of the cooler allows an easy production and assembly of the cooler. Both parts of the cooler, the heat sink plate and the cooler housing, can easily be fastened together in one step to the gearbox housing. A sealing ring can be arranged between the heat sink element and the cooler housing in order to provide a leak-proof sealing of the closed inner space.

Further aspects of the invention concern the features of the heat sink element. The heat sink element preferably comprises at least one rib to increment the thermal convection from the heat sink element to the cooling fluid. Such a rib can be integrally formed with a ground plate of the heat sink element. Advantageously the ground plate of the heat sink element has got a large contact surface on its lower side, i.e. on the side facing the transmission gearbox. The ribs are preferably oriented in the direction of the flow of the cooling fluid in order to not increase the pressure drop inside the cooler. Such ribs can also guide the cooling fluid through the closed inner space inside the cooler from an inlet of the cooler to an outlet. The number, form and arrangement of such ribs can be determined to reach an optimum regarding sufficient thermal convection and low pressure drop.

For use with seawater as cooling fluid the heat sink element can be made of sea water resistant materials or it should have a surface treatment to increment sea water corrosion resistance.

An inlet connection and an outlet connection for the cooling fluid may be formed integrally with the plastic cooler housing. These connections can be formed for example as one inlet nipple and one outlet nipple.

A cheap and reliable production method for such a plastic cooler housing is injection moulding. This production method is advantageous, because the cooler housing can thus be produced in one process with a reduced number of production steps.

At least one hole is provided at the cooler housing to fasten the cooler to the gearbox housing by at least one fastening bolt or screw. The simple construction and easy mechanical connectivity of the cooler makes it usable for a variety of transmission gearboxes and allows the attachment of the cooler at different positions at the gearbox housing.

In order to avoid damage to the plastic cooler housing caused by a fastening force the cooler housing comprises at least one compression limiting element. Such a compression limiting element can be a metal bushing which can be inserted into the associated hole during assembly or it can be produced together with the cooler housing in an insert moulding process.

The present invention covers further a marine transmission gearbox with a gearbox housing, wherein a cooler as described above is attached to the gearbox housing. The cooler may be part of a cooling system wherein cooling fluid, e.g. seawater, is used to cool the transmission gearbox, the engine and the exhaust system. Therefore the inlet connection of the cooler may be connected to a seawater intake via a filter, while the outlet connection of the cooler may be connected to a heat exchanger of the engine of the boat.

The following detailed description of a preferred embodiment of the invention in connection with the accompanying drawings will help to understand the objects, features and advantages of the invention, wherein.

Figure 1:
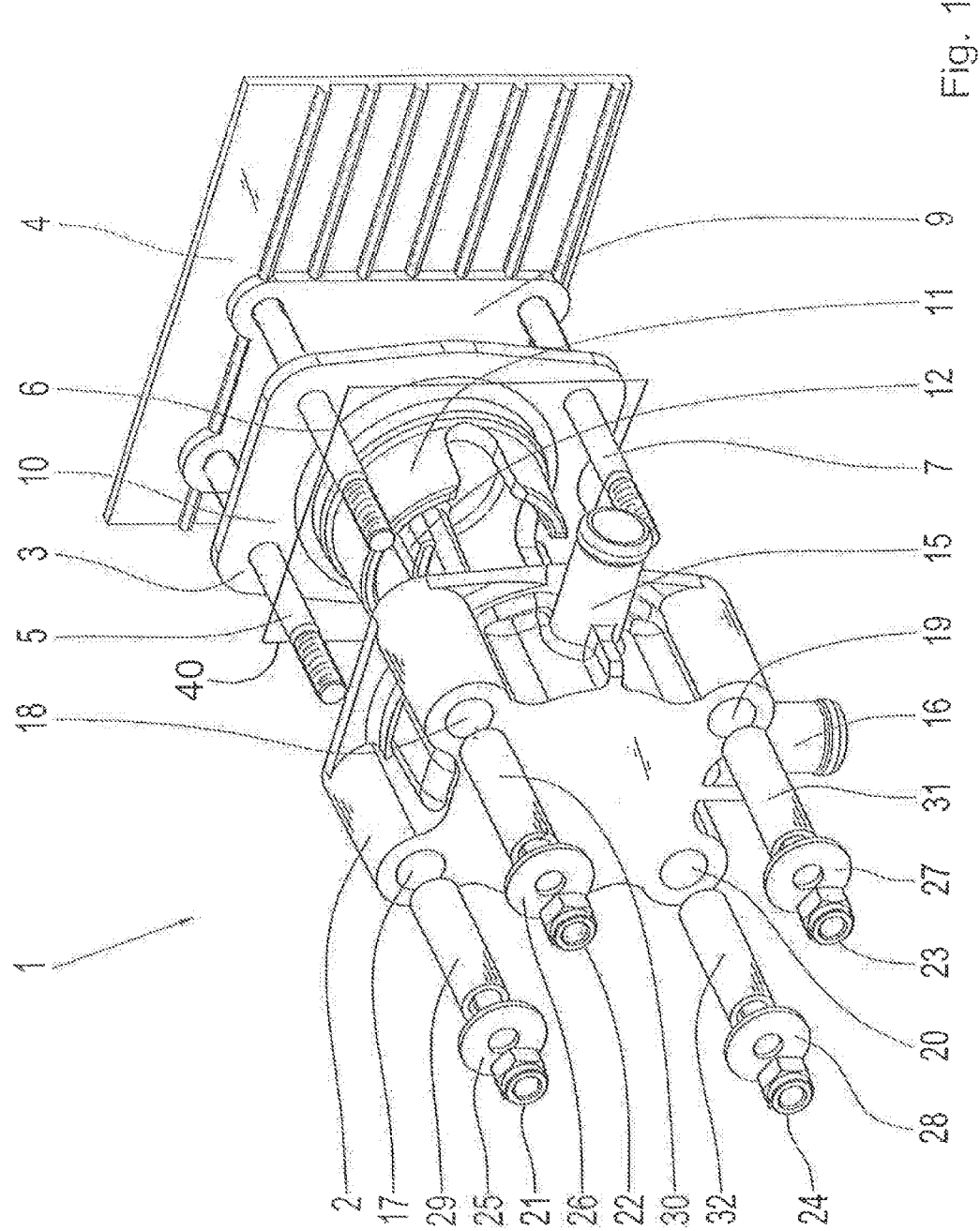
FIG. 1 shows a cooler according to the invention in an exploded view.
Figure 2:
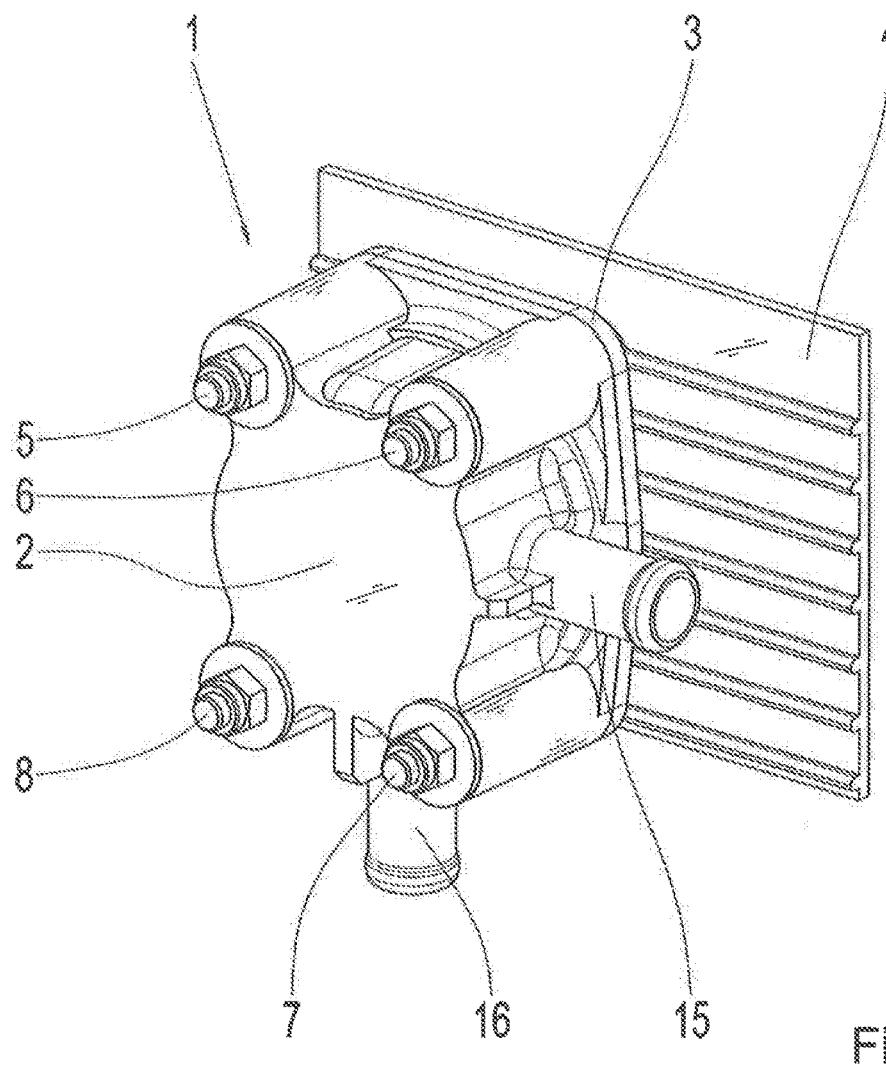
FIG. 2 shows the assembled cooler of FIG. 1 mounted to a gearbox.

The principal construction of a cooler according to the present invention can be seen in FIG. 1 and FIG. 2. The main components of the cooler 1 are the cooler housing 2 and the heat sink element 3. The cooler housing 2 is made of plastic and the heat sink element 3 of this embodiment is made of a metal. FIG. 2 shows the cooler 1 in assembled condition attached to a gearbox housing 4 of a marine transmission gearbox. The heat sink element 3 is partly arranged inside the cooler housing 2 and both parts are fastened together to a side wall of a gear box housing 4. For this purpose four fastening bolts 5, 6, 7 and 8 are fastened into the side wall of gear box housing 4, which is shown only partially in FIG. 1 and FIG. 2.

In the assembled condition the heat sink element 3 and the plastic cooler housing 2 build up a closed inner space for the passage of the cooling fluid. A sealing ring 40 is diagrammatically shown in FIG. 1 and arranged between the heat sink element 3 and the cooler housing 2 in order to ensure that the closed inner space is leak-proof.

At the gearbox housing 4 there is a plane and smooth contact surface 9 provided for close contact with a corresponding contact surface at the side of the heat sink element 3 which faces the gearbox housing 4. These contact surfaces ensure an enhanced heat transfer and coding effect of the coder 1. In order to further facilitate the heat transfer from the gearbox housing 2 to the heat sink element 3 a heat sink compound like a high conductibility gel can be used between the two parts respectively between said contact surfaces.

Figure 3:
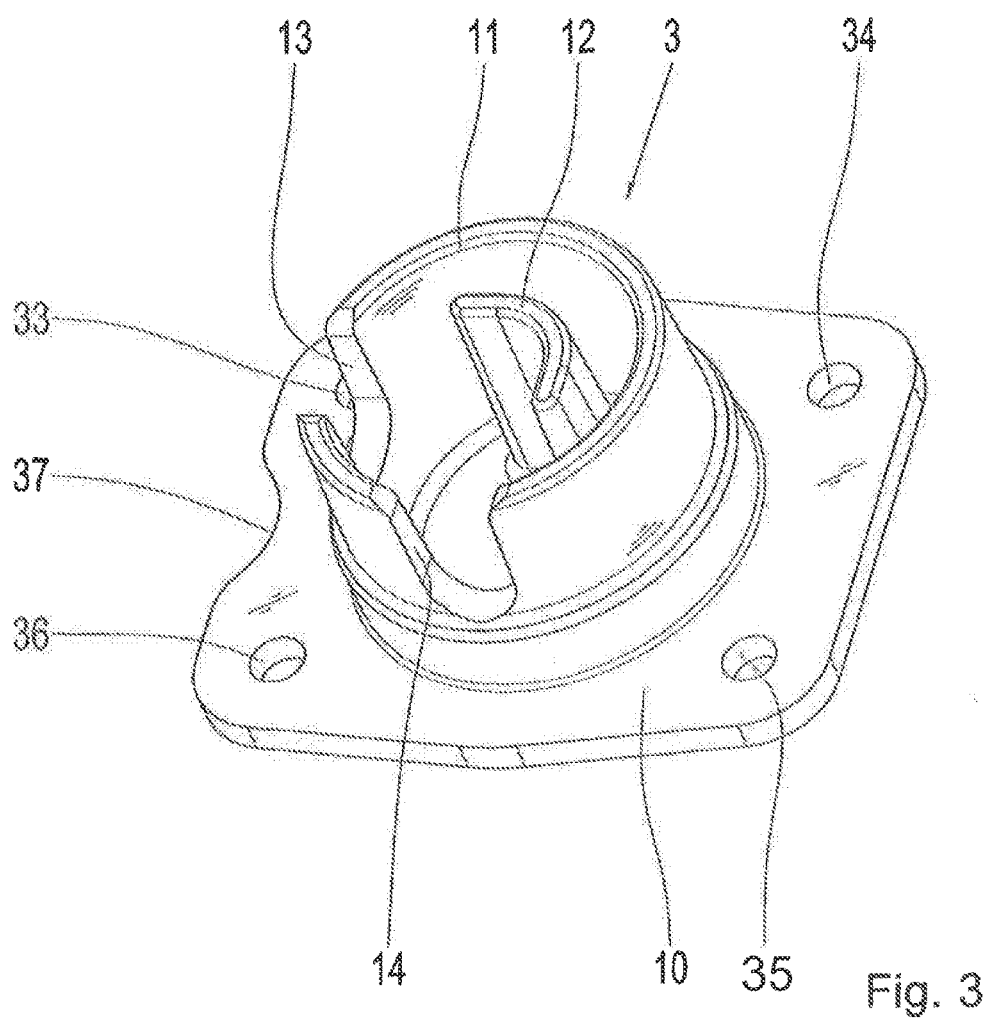
FIG. 3 shows the heat sink element of the cooler in FIG. 1.
Figure 4:
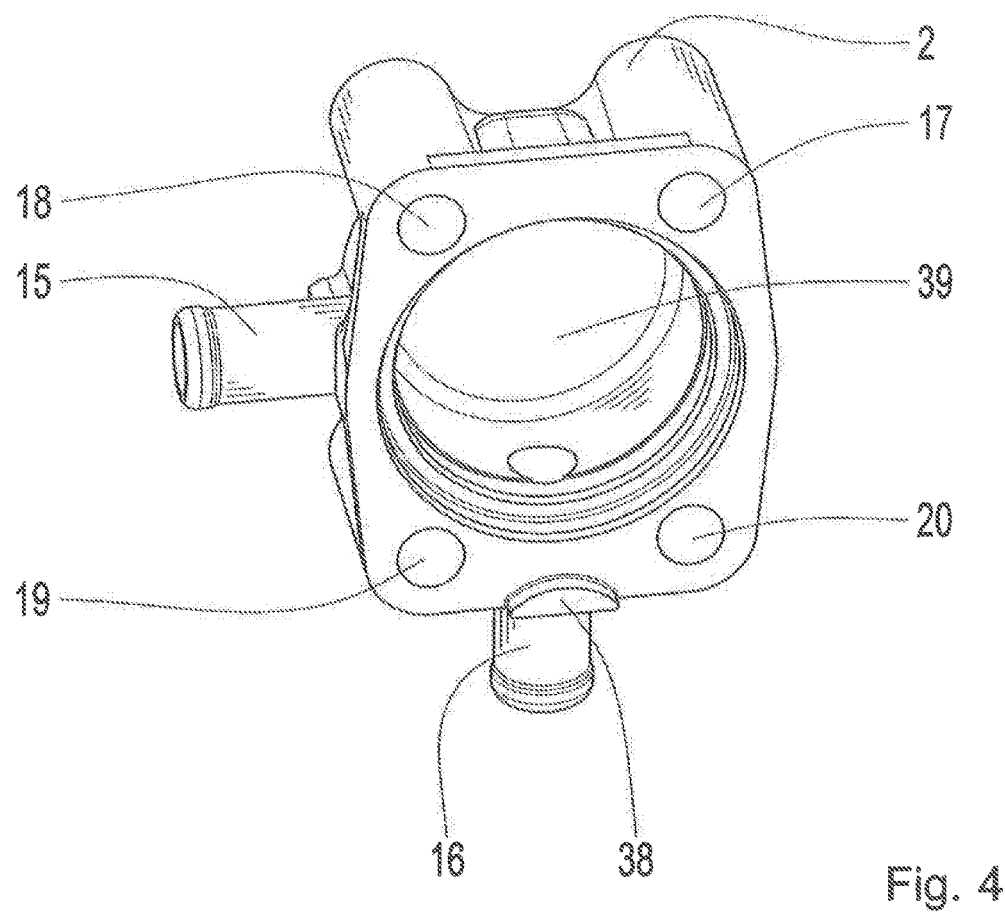
FIG. 4 shows the cooler housing of the cooler in FIG. 1.

As can best be seen in FIG. 3 the heat sink element 3 comprises a ground plate 10 and two ribs 11 and 12. The ribs 11 and 12 are integrally formed with ground plate 10 and extend into the cavity 39 of the cooler 1 resp. the cooler housing 2 in assembled condition. The main function of the ribs 11 and 12 is to increment the thermal convection from the heat sink element 3 to the cooling fluid. The ribs 11 and 12 are oriented in the direction of the flow of the cooling fluid in order to not increase the pressure drop inside cooler 1. In the present embodiment the outer rib 11 has basically the form of a cylinder wall. There is a first recess 13 arranged at the outer rib 11 in order to allow the passage of cooling fluid from an inlet connection 15 into an inside space of the cylindrical outer rib 11. In the inside space of rib 11 the cooling fluid passes along both sides of the curved inner rib 12. A second recess 14 at the outer rib 11 allows the passage of cooling fluid to an outlet connection 16. It will be appreciated, however, that the flow of cooling fluid may be reversed, if desired. Moreover the form, arrangement and number of ribs can be varied for other embodiments within the scope of the invention.

In the present embodiment the inlet connection 15 and the outlet connection 16 are circumferentially spaced from one another by an angle of 90 degrees, as shown in FIGS. 1 and 2, although this is not necessarily the case. For example, the inlet and outlet connections can also be circumferentially aligned with one another or circumferentially spaced apart by angles of more than 90 degrees, as long as a sufficient cooling fluid distribution is maintained in the inner space of cooler 1.

In the embodiment shown in the drawings, the inlet connection 15 and the outlet connection 16 are formed integrally with the cooler housing 2. Cooler housing 2 is manufactured in one part with the inlet connection 15 and the outlet connection 16 by injection moulding.

Heat from the gearbox housing 4 is transferred via the contact surface 9 to ground plate 10 into the ribs 11 and 12 of the heat sink plate 3. The cooling fluid flows along the ribs 11 and 12, thereby taking up the heat from the ribs 11, 12 and carrying the heat out of the cooler 1 through the outlet connection 16, thus causing the cooling effect to the gearbox housing 4.

To fasten the cooler 1 to the gearbox housing 4 a first end of the four fastening bolts 5, 6, 7 and 8 are screwed into suitable threaded holes in the gearbox housing 4. The heat sink element 3 comprises four holes 33, 34, 35 and 36 and the cooler housing 2 comprises four holes 17, 18, 19, 20 which fit to the positions of the fastening bolts 5, 6, 7 and 8, so that the heat sink element 3 and the cooler housing 2 can easily be assembled and fixed to the gearbox housing 4 by fitting them onto the fastening bolts. The complete cooler 1 can be fastened to the gearbox housing 4 by four screw nuts 21, 22, 23 and 24 at the free second ends of the fastening bolts 5, 6, 7 and 8.

A compression limiting element 29, 30, 31 and 32 is provided for each fastening bolt 5, 6, 7 and 8 in order to avoid damage to the plastic cooler housing 2 caused by the fastening force caused by the screw nuts 21, 22, 23 and 24. The compression limiting elements 29, 30, 31 and 32 are metal bushings which can be inserted in the holes 17, 18, 19 and 20 during assembly of the cooler 1. In other embodiments such compression limiting elements can also be manufactured as a part of the cooler housing for example during an insert moulding process. For reliable attachment of the cooler 1 and for even distribution of the fastening force to the cooler housing 2 there is a washer 25, 26, 27 and 28 mounted with each screw nut 21, 22, 23 and 24.

A formfitting element 38 is arranged at the cooler housing 2. The form fitting element 38 corresponds with a recess 37 in the ground plate 10 of the heat sink element 3 in such a way, that the heat sink element 3 and the cooler housing 2 can only be assembled, if both parts are aligned correctly to each other. This way the form fitting element and the recess 37 ensure the correct assembly of the heat sink element 3 in the cooler housing 2, especially with regard to the position of the inlet and outlet connections 15 and 16 of the cooler housing 2 in relation to the ribs 11, 12 and recesses 13, 14 of the heat sink element 3.

REFERENCE NUMERAL 1 cooler
2 cooler housing
3 heat sink element
4 gearbox housing
5 fastening bolt
6 fastening bolt
7 fastening bolt
8 fastening bolt
9 contact surface
10 ground plate
11 rib
12 rib
13 recess
14 recess
15 inlet connection
16 outlet connection
17 hole
18 hole
19 hole
20 hole
21 nut
22 nut
23 nut
24 nut
25 washer
26 washer
27 washer
28 washer
29 compression limiting element
30 compression knifing element
31 compression limiting element
32 compression limiting element 33 hole
34 hole
35 hole
36 hole
37 recess
38 form fitting element
39 cavity

The invention claimed is:

1. A cooler for cooling a marine transmission gearbox by a cooling fluid, the cooler (1) comprising:
a cooler housing (2) which is made of plastic and is independent of and detachably connectable to a heat sink element,
the heat sink element (3) is arranged at least partially inside a cavity (39) of the cooler housing (2) so that the heat sink element (3) is in contact with the cooling fluid, during operation,
the heat sink element has an arcuate rib (12) and a cylindrical rib (11) that project into the cavity when the cooler housing and the heat sink element are connected,
the heat sink element (3) is independent of and detachably securable to a gearbox housing (4) of the marine transmission gearbox in such a way that heat is transferable from the gearbox housing (4), via the heat sink element (3), to the cooling fluid and the cooling fluid is prevented from contacting the gearbox housing.

2. The cooler according to claim 1, wherein the cooler housing (2) and the heat sink element (3) form a circular closed inner space for the cooling fluid to flow inside the cooler (1) between an inlet connection (15) and an outlet connection (16).

3. The cooler according to claim 1, wherein a sealing ring is arranged between the heat sink element (3) and the cooler housing (2).

4. The cooler according to claim 1, wherein the cylindrical rib (11) increments thermal convection from the heat sink element (3) to the cooling fluid.

5. The cooler according to claim 4, wherein at the cylindrical rib (11) is oriented in a direction of the flow of the cooling fluid.

6. The cooler according to claim 1, wherein the heat sink element (3) is made of aluminum, aluminum alloy or red brass, the cylindrical rib defines an inner space, and the arcuate rib is located within the inner space.

7. The cooler according to claim 1, wherein the heat sink element (3) is salt water resistance surface treated.

8. The cooler according to claim 1, wherein the cooler housing (2) comprises an inlet connection (15) and an outlet connection (16) for the cooling fluid which are formed integrally with the cooler housing (2).

9. The cooler according to claim 8, wherein the cooler housing (2) is an injection moulded part, and the heat sink element comprises the cylindrical rib having a first recess and a second recess which align with the inlet and the outlet connections, respectively, and facilitate a flow of the cooling fluid from the inlet connection through an interior space of the cylindrical rib to the outlet connection.

10. The cooler according to claim 1, wherein the cooler housing (2) comprises at least one hole (17, 18, 19, 20) to fasten the cooler (1) to the gearbox housing (4) by at least one fastening bolt (5, 6, 7, 8).

11. The cooler according to claim 10, wherein the cooler housing (2) comprises at least one compression limiting element (29, 30, 31, 32) adapted to avoid damage to the plastic cooler housing (2) caused by a fastening force of the at least one fastening bolt (5,6, 7, 8).

12. The cooler according to claim 11, wherein the at least one compression limiting element (29, 30, 31,32) is a metal bushing.

13. A marine transmission gearbox in combination with a cooler (1), for cooling the marine transmission gearbox, the marine transmission gearbox comprising:
a gearbox housing (4) having a contact surface,
the cooler comprises:
a cooler housing which is made of plastic and is independent of and detachably connectable to a heat sink element,
the heat sink element having a first side with a contact surface and a second side with a cylindrically ribbed surface which is arranged at least partially inside a cavity defined, in part, by the cooler housing so that the second side of the heat sink element is in contact with a cooling fluid during operation, and
the contact surface of the heat sink element of the cooler is independent of and detachably securable to the contact surface of the gearbox housing in such a way that the cooling fluid is prevented from contacting the contact surface of the gearbox housing and heat is transferable from the gearbox housing, via the heat sink element, to the cooling fluid.

14. A marine transmission gearbox cooler comprising:
a heat sink element which is independent of and detachably connectable to a gearbox housing of the marine transmission gearbox;
a cooler housing which is made of plastic and is independent of and detachably connectable to the heat sink element, and when connected to the heat sink element, the cooler housing and the heat sink element define a cavity;
the heat sink element has an arcuate rib and a cylindrical rib that project into the cavity when the cooler housing and the heat sink element are connected, the cylindrical rib defines an interior space and the arcuate rib projects into the interior space;
the cooler housing has an inlet connection and an outlet connection which direct cooling fluid through recesses in the cylindrical rib into and out of the interior space so as to contact the cylindrical rib and the arcuate rib of the heat sink element during operation of the marine transmission gearbox; and
the heat sink element contacts the gearbox housing of the marine transmission gearbox such that heat is transferable from the gearbox housing, via the heat sink element, to the cooling fluid.

* * * * *